United States Patent
Soni et al.

(10) Patent No.: US 12,289,211 B1
(45) Date of Patent: Apr. 29, 2025

(54) SEAMLESSLY IMPLEMENTING PLANNED OUTAGES ACROSS NETWORK NODES

(71) Applicant: International Business Machines Corporation, Armonk, NY (US)

(72) Inventors: Bharti Soni, Pune (IN); Komal Shailendra Shah, Pune (IN); Tanmay Jayant Mujumdar, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/380,101

(22) Filed: Oct. 13, 2023

(51) Int. Cl.
*H04L 41/12* (2022.01)
*H04L 41/082* (2022.01)

(52) U.S. Cl.
CPC ............ *H04L 41/12* (2013.01); *H04L 41/082* (2013.01)

(58) Field of Classification Search
CPC .............................. H04L 41/12; H04L 41/082
USPC .......................................................... 709/224
See application file for complete search history.

(56) References Cited

U.S. PATENT DOCUMENTS

| 8,626,967 B1* | 1/2014 | Naik | G06F 3/0662 710/31 |
|---|---|---|---|
| 8,909,980 B1* | 12/2014 | Lewis | G06F 3/0635 714/4.11 |
| 8,949,656 B1* | 2/2015 | Ninan | G06F 11/2005 714/4.11 |
| 2020/0021654 A1 | 1/2020 | Rao et al. | |
| 2020/0379857 A1 | 12/2020 | Shah et al. | |
| 2021/0181947 A1 | 6/2021 | Patel et al. | |
| 2021/0278975 A1* | 9/2021 | Marappan | G06F 3/0655 |
| 2022/0276874 A1* | 9/2022 | Charles | G06F 9/4411 |

OTHER PUBLICATIONS

Anonymous, "Method and Apparatus of Notifying the Host Multipath Layer about Target Node Planned Outage to Quickly Switch Over Paths," IP.com Prior Art Database, Technical Disclosure No. IPCOM000268111D, Dec. 27, 2021, 9 pages.

* cited by examiner

*Primary Examiner* — Karen C Tang
(74) *Attorney, Agent, or Firm* — Zilka-Kotab, P.C.

(57) ABSTRACT

A computer-implemented method, according to one approach, includes: sending a notification to a host regarding a first logical unit number (LUN) in response to receiving an indication that a first node will be taken offline. The first LUN that the notification is sent to has a preferred communication path that extends through the first node. Communication paths extending through the first node are blocked and communication paths extending through a second node are promoted. Moreover, in response to determining that existing I/O operations previously assigned to the first node have been completed, the first node is taken offline. I/O operations are thereby sent to the first LUN through the second node while the first node is offline.

20 Claims, 10 Drawing Sheets

SEAMLESSLY IMPLEMENTING PLANNED OUTAGES ACROSS NETWORK NODES

BACKGROUND

The present invention relates to distributed storage systems, and more specifically, this invention relates to sequentially taking network nodes offline without impacting performance.

Data production has continued to increase over time. For instance, the rise of smart enterprise endpoints has led to large amounts of data being generated at remote locations. Data production will further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

Further still, electronic data has a number of benefits compared to equivalent physical representations of the data. For example, electronic documents are easier to store and access in comparison to physical documents. While accessing a physical document involves manually searching each document in a collection until the desired document is found, multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts. In view of these benefits, an increasing amount of physical material has been digitized, thereby further increasing data production.

Cloud computing has been implemented to improve the processing and storage of an increasing amount of data. However, the network infrastructure used to transfer data to cloud computing locations has become increasingly important to data processing. It follows that any network downtime has a significant impact on the performance of the system. In an attempt to combat this downtime, conventional products have implemented failover and failback processes.

SUMMARY

A computer-implemented method, according to one approach, includes: sending a notification to a host regarding a first logical unit number (LUN) in response to receiving an indication that a first node will be taken offline. The first LUN that the notification is sent to has a preferred communication path that extends through the first node. Communication paths extending through the first node are blocked and communication paths extending through a second node are promoted. Moreover, in response to determining that existing input/output (I/O) operations previously assigned to the first node have been completed, the first node is taken offline. I/O operations are thereby sent to the first LUN through the second node while the first node is offline.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a host and a clustered layer having first and second nodes. The system also includes a processor as well as logic that is integrated with the processor, executable by the processor, or integrated with and executable by the processor. The logic is configured to: perform the foregoing method.

Other aspects and implementations of the present invention will become apparent from the following detailed description, which, when taken in conjunction with the drawings, illustrate by way of example the principles of the invention.

DETAILED DESCRIPTION

Figure 1:
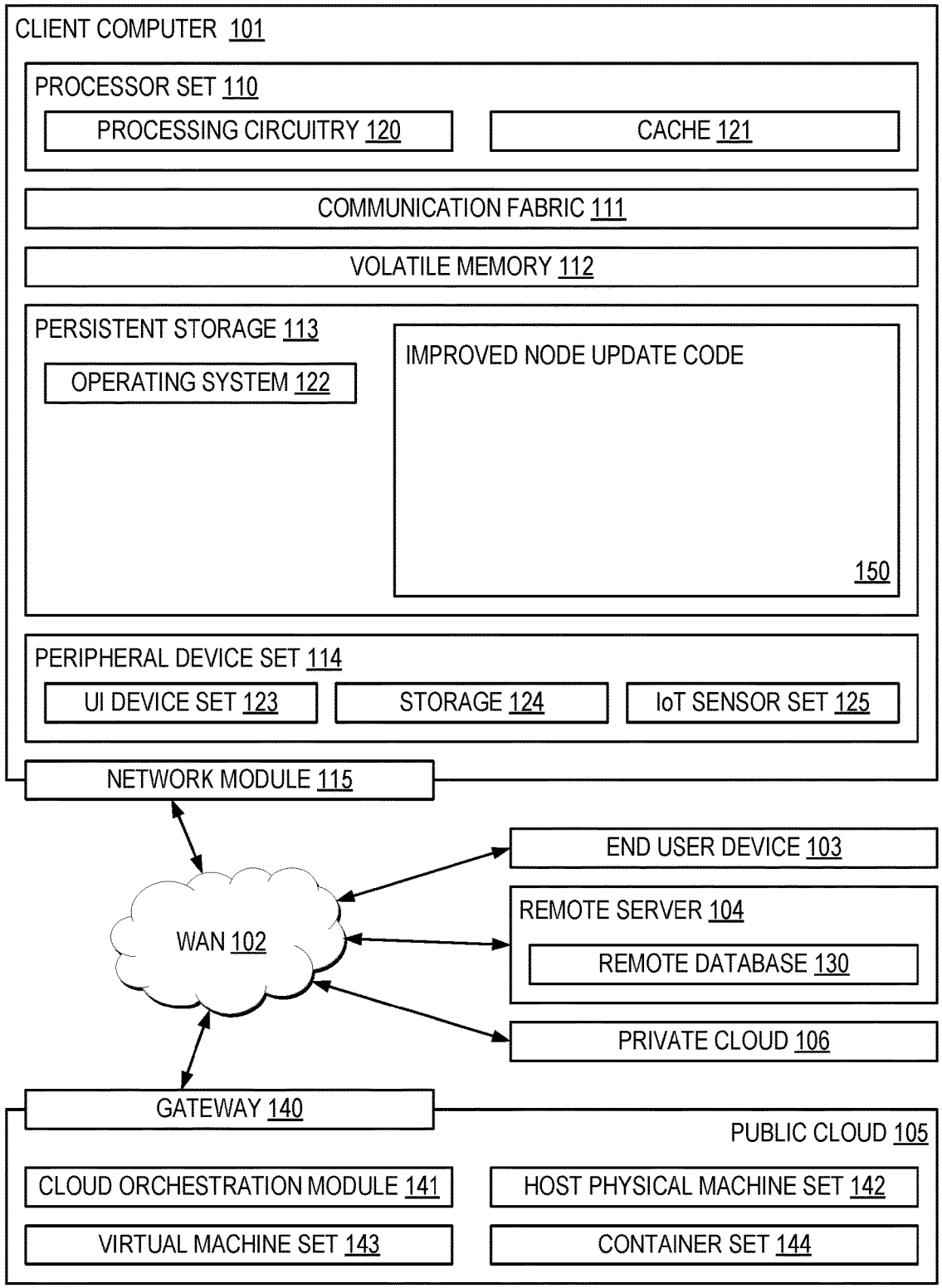
FIG. 1 is a diagram of a computing environment, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for enabling planned outages of nodes in a clustered system without experiencing any data errors and/or decreased performance capabilities, by orchestrating the completion of I/O requests along alternate communication paths. Implementations herein allow for software and/or hardware updates to be made seamlessly to network infrastructure without impacting performance in real-time. Implementations herein are thereby able to overcome processing based issues that have plagued conventional systems, e.g., as will be described in further detail below.

In one general approach, a computer-implemented method includes: sending a notification to a host regarding a first LUN in response to receiving an indication that a first node will be taken offline. The first LUN that the notification is sent to has a preferred communication path that extends through the first node. Communication paths extending through the first node are blocked and communication paths extending through a second node are promoted. Moreover, in response to determining that existing I/O operations previously assigned to the first node have been completed, the first node is taken offline. I/O operations are thereby sent to the first LUN through the second node while the first node is offline.

In another general approach, a computer program product includes a computer readable storage medium having program instructions embodied therewith. The program instructions are readable by a processor, executable by the processor, or readable and executable by the processor, to cause the processor to: perform the foregoing method.

In yet another general approach, a system includes: a host and a clustered layer having first and second nodes. The system also includes a processor as well as logic that is integrated with the processor, executable by the processor, or integrated with and executable by the processor. The logic is configured to: perform the foregoing method.

Various aspects of the present disclosure are described by narrative text, flowcharts, block diagrams of computer systems and/or block diagrams of the machine logic included in computer program product (CPP) implementations. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product (CPP) is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved node update code at block 150 for enabling planned outages of nodes in a clustered system without experiencing any data errors and/or decreased performance capabilities by orchestrating the completion of I/O requests along alternate communication paths. In addition to block 150, computing environment 100 includes, for example, computer 101, wide area network (WAN) 102, end user device (EUD) 103, remote server 104, public cloud 105, and private cloud 106. In this implementation, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various implementations, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this implementation, public cloud 105 and private cloud 106 are both part of a larger hybrid cloud.

In some aspects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

As noted above, data production has continued to increase over time. For instance, the rise of smart enterprise endpoints has led to large amounts of data being generated at remote locations. Data production will further increase with the growth of 5G networks and an increased number of connected mobile devices. This issue has also become more prevalent as the complexity of machine learning models increases. Increasingly complex machine learning models translate to more intense workloads and increased strain associated with applying the models to received data.

Further still, electronic data has a number of benefits compared to equivalent physical representations of the data. For example, electronic documents are easier to store and access in comparison to physical documents. While accessing a physical document involves manually searching each document in a collection until the desired document is found, multiple electronic documents can be automatically compared against one or more keywords. Moreover, electronic documents can be uploaded from and/or downloaded to any device connected to a network, while tangible documents (e.g., papers) must be physically transported between locations. Similarly, electronic documents take up much less space than their physical counterparts. In view of these benefits, an increasing amount of physical material has been digitized, thereby further increasing data production.

Cloud computing has been implemented to improve the processing and storage of an increasing amount of data. However, the network infrastructure used to transfer data to cloud computing locations has become increasingly important to data processing. It follows that any network downtime has a significant impact on the performance of the system. In an attempt to combat this downtime, conventional products have performed failover and failback processes. However, during the failover and failback periods in conventional products, a host is not aware that some of the paths are not available for the processing. This has led to a number of I/O requests (or "I/O operations") being issued along communication paths that are thought to be active, thereby causing a significant number of I/O failures. Only after several attempts of reissuing failed I/O requests along the unknowingly unavailable communication paths may a timeout occur, thereby causing the I/O requests to be sent using alternate paths.

This process of detecting that one of path is down then retrying on other paths takes time as it depends heavily on the timeout settings and other system configurable variables. Conventional products have thereby suffered inefficiencies in performing I/O requests. In environments having time critical applications running, this increased delay has a significant impact on data retention and operational efficiency of the overarching system as a whole.

In sharp contrast to these conventional shortcomings, implementations herein are able to resolve this issue so that software and/or hardware updates may be seamlessly made to network infrastructure without impacting performance in real-time. Implementations herein are thereby able to overcome processing based issues that have plagued conventional systems, e.g., as will be described in further detail below.

Looking now to FIGS. 2A-2D, a distributed system 200 is depicted in several different configurations according to different phases of operation. As an option, the present system 200 may be implemented in conjunction with features from any other embodiment listed herein, such as those described with reference to the other FIGS., such as FIG. 1. However, such system 200 and others presented herein may be used in various applications and/or in permutations which may or may not be specifically described in the illustrative embodiments listed herein. Further, the system 200 presented herein may be used in any desired environment. Thus FIGS. 2A-2D (and the other FIGS.) may be deemed to include any possible permutation.

Figure 2A:
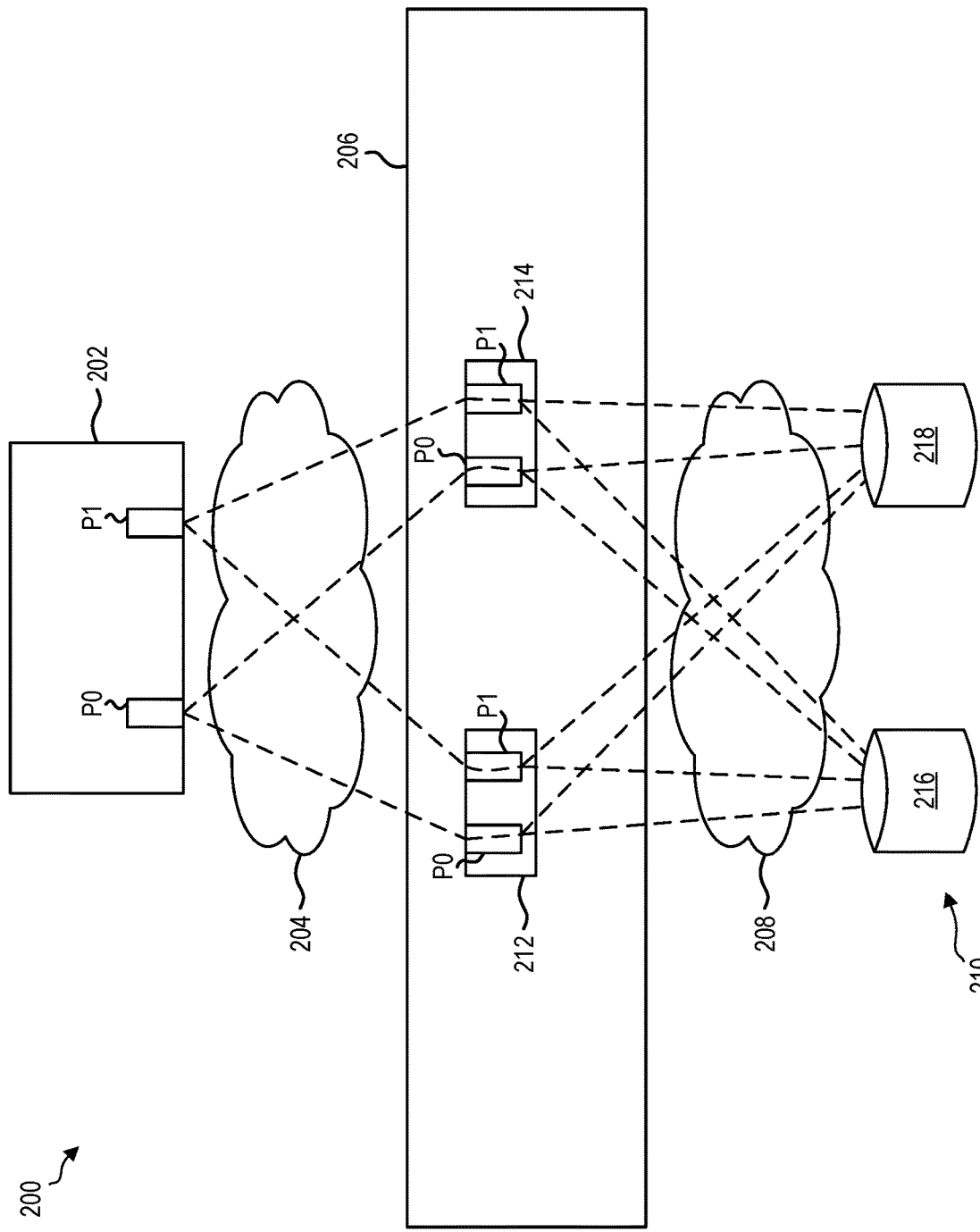
FIG. 2A is a representational view of a distributed system in a first configuration according to one approach.

Looking first to FIG. 2A, the distributed system 200 is shown as including a host location 202 that is in communication with a clustered layer 206 over network 204. The clustered layer 206 is also in communication with a remote storage array 210 over network 208. The host location 202, clustered layer 206, and storage array 210 may each thereby be positioned in different geographical locations.

The networks 204, 208 are preferably SANs. However, host location 202 can be connected to external systems (e.g., the external "world") via a WAN or other type of network. However, it should be noted that approaches herein may be implemented differently. For instance, in some approaches network 204 and/or 208 may be part of a same (shared) network, e.g., such as the Internet, LANs, PSTNs, SANs, internal telephone networks, etc. It follows that communication between locations may be achieved using requests, commands, etc., other than small computer systems interface (SCSI) commands as described in various approaches herein. As a result, any desired information, data, commands, instructions, responses, requests, etc. may be sent between host location 202, clustered layer 206, and/or storage array 210, regardless of the amount of separation which exists therebetween, e.g., despite being positioned at different geographical locations.

However, it should be noted that two or more of the host location 202, clustered layer 206, and storage array 210 may be connected differently in some approaches. According to an example, which is in no way intended to limit the invention, two servers may be located relatively close to each other and connected by a wired connection, e.g., a cable, a fiber-optic link, an Ethernet link, a wire, etc., or any other type of connection which would be apparent to one skilled in the art after reading the present description. It should also be noted that the term "host" is in no way intended to be limiting. For instance, while a host may be described as an individual in some implementations herein, a host may be an application, an organization, a preset process, etc. The use of "data" and "information" herein is in no way intended to be limiting either, and may include any desired type of details, e.g., depending on the type of operating system implemented at host location 202, on clustered layer 206, and/or at storage array 210.

For instance, in data center environments, a host may be connected to SAN storage controllers. This connectivity may be achieved using interconnect protocols like Internet small computer systems interface (iSCSI), fiber channel (FC), iSCSI Extensions for RDMA (iSER), etc. It follows that in order to access storage, a host discovers storage devices that are connected to them, and logs into the storage using an interconnect protocol, e.g., as mentioned above. Once logged into a target controller, the host is able to issue I/Os on the devices that are mapped to that host, as if they were locally present.

Host location 202 includes ports P0, P1, each of which are able to exchange information over connections that extend to ports P0, P1 of nodes 212, 214 as shown. Each of ports P0, P1 at nodes 212, 214 are also connected to logical unit numbers (LUNs) 216, 218 that may be physically located in memory components of the storage array 210 in some approaches, managed at a remote location over a network, etc. It follows that each of the nodes 212, 214 of the clustered layer 206 connect the host 202 to the LUNs 216, 218 in the storage array 210.

For instance, port P0 of node 212 is shown as connecting port P0 at the host location 202, to LUN 216, while P2 of node 212 is shown as connecting port P1 of host location 202 to LUN 218. It follows that storage controllers may be deployed as a clustered system having multiple nodes, where each node is capable of being a target. According to an example, redundant SCSI connections may extend through multiple nodes (typically 2). Thus, when one node goes offline the partner node is able to assume responsibility for servicing I/Os intended for the offline node.

Each of the nodes 212, 214 are shown as connecting both ports P0, P1 at the host location 202 to both of the LUNs 216, 218, it should be noted that the different connection paths may be used differently depending on the situation. For instance, port P0 at host location 202 is connected to LUN 216 through port P0 of node 212 as well as port P0 of node 214. While both paths may be configured to transfer information (e.g., data, I/O requests, operations, etc.) to LUN 216, one of the paths is designated as the preferred communication path between port P0 of host location 202 and LUN 216, while the redundant path is reserved for backup. For instance, in the present approach, the preferred path extends through both P0 and P1 of node 212, while the backup communication path extends through P0 and P1 of node 214. In other words, LUN 216 is accessed via node 212 only, as the communication path between host location 202 and LUN 216 running through node 212 is active optimized. Similarly, LUN 218 is accessed via node 214 only, as the communication path between host location 202 and LUN 218 running through node 214 is active optimized. It follows that in preferred approaches, the number of LUNs being accessed are divided about evenly between the available nodes of the clustered layer 206. For example, in a situation involving 8 different LUNs, the odd numbered LUNs may be accessed using a first node, while even numbered LUNs are accessed using a second node. In other words, the odd numbered LUNs will have active optimized paths extending through the first node, while even numbered LUNs will have active optimized paths extending through the second node.

For approaches implementing SCSI based communication, the preferred path may be indicated as "active optimized," while the backup communication path is indicated as "active non-optimized." This allows for information to be exchanged between host location 202 and LUN 216 efficiently, in addition to providing a remedy for situations where the preferred communication path becomes unavailable. Similarly, port P1 at host location 202 is connected to LUN 218 through port P1 of node 212 as well as port P1 of node 214. Moreover, the preferred path extends through P1 of node 214, while the backup communication path extends through P1 of node 212.

It follows that regardless of whether node 212 or node 214 goes offline, information may still be sent from the host location 202 to the appropriate LUN in storage array 210. For example, while I/O requests are sent along preferred communication paths to the appropriate LUNs, in situations where a preferred node goes offline, the host may begin issuing I/O requests along non-preferred (e.g., redundant) communication paths, e.g., as will soon become apparent.

Looking still to FIG. 2A, the host location 202 may be considered a SCSI "initiator", while nodes 212, 214 are SCSI "target nodes" in single cluster. Storage array 210 is also directly attached to the nodes 212, 214, while in some approaches the storage may be exposed to nodes 212, 214 via storage virtualization. While host location 202 has two LUNs 216, 218 exposed from SCSI target controller, LUN 216 has a preferred communication path extending through node 212, while LUN 218 has a preferred communication path through node 214.

However, in situations where one of the storage nodes 212, 214 go offline, particularly in situations where the node failure is planned or caused by a known reason like network activity, software and/or hardware upgrades, etc., the Internet protocol (IP) addresses and/or world wide port names (WWPNs) are transferred from the node going offline to the alternate node. The alternate node is thereby able to facilitate the performance of I/O requests while the other node is temporarily offline. Once the node that had gone down is operational again, the IP addresses, WWPNs, and SCSI connections may be reinstated such that operation is normalized.

Figure 2B:
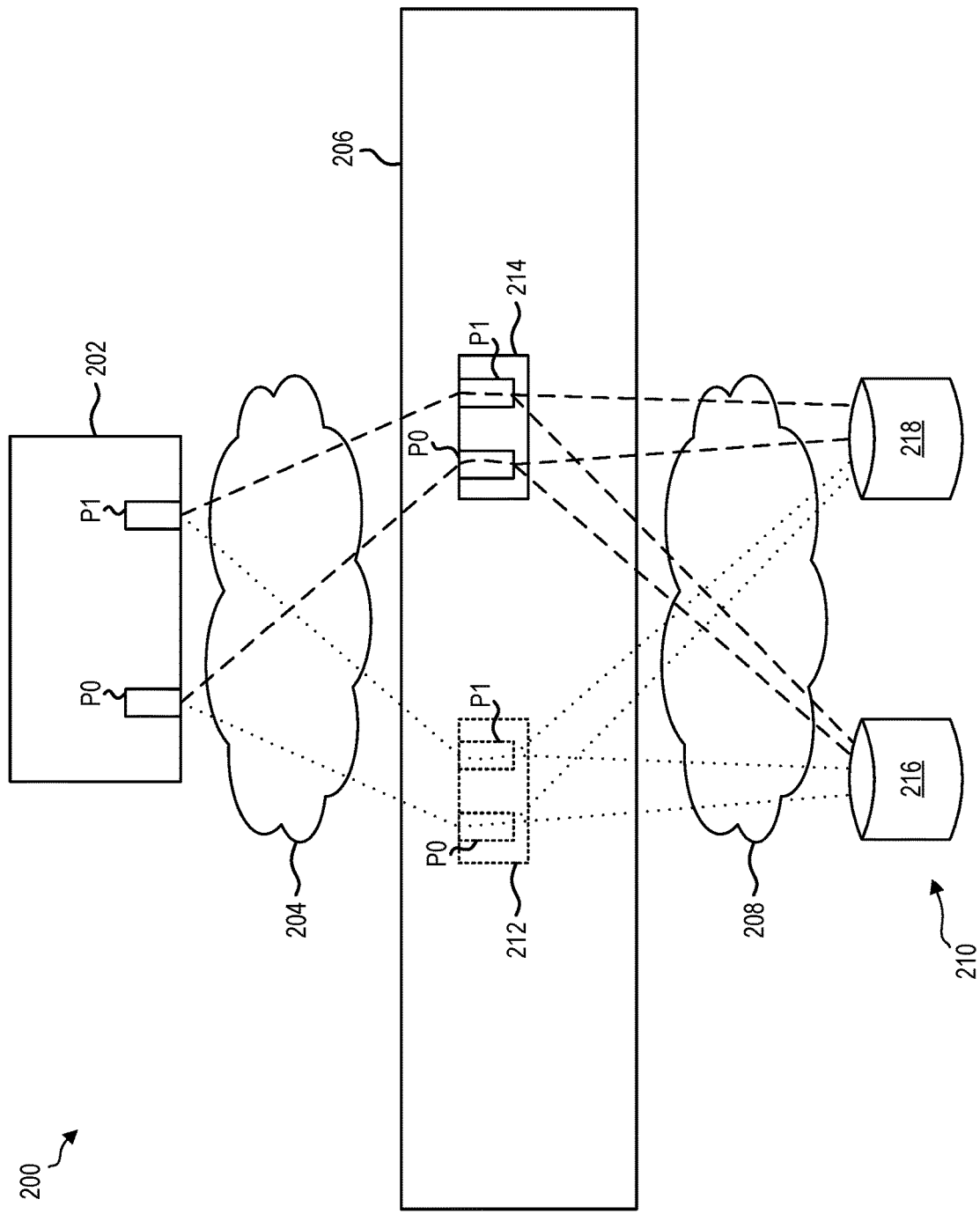
FIG. 2B is a representational view of the distributed system of FIG. 2A, in a second configuration according to one approach.

Looking now to FIG. 2B, the distributed system 200 is shown in a configuration where node 212 has been taken offline, as indicated by the dashed lines. As noted above, outages may be planned for nodes of a clustered layer, e.g., to update hardware and/or software implemented in the nodes. It follows that node 212 may be intentionally taken offline in order to replace hardware therein, update software implemented on the hardware therein, add functionality to the node, etc. Before being taken offline, a notification may be sent to node 212 and/or LUN 216 to provide notice of the planned downtime.

As explained above, conventional products are unaware of when a node goes offline, and therefore will continue attempting to issue requests to offline nodes until a timeout is reached and those paths are failed. However, timeouts are usually in the order of 30 seconds to 2 mins, or even longer, thereby causing significant I/O delay.

In sharp contrast, implementations herein are able to proactively notify host(s) regarding a planned node outage so that the multipath driver on the hosts can quickly switch over to alternate communication paths and avoid continually retrying failed I/O requests on communication paths that are offline, or will be taken offline shortly. This is possible in scenarios where the node outage is orchestrated by the administrator in a pre-determined and controlled fashion. An example of this is software upgrade on the storage controller where each node is taken down one at a time for a non-disruptive upgrade. Hardware upgrades for performed on the nodes is another example.

For instance, registered state change notifications (RSCNs) include fiber channel fabric notifications that may be sent to all hosts, informing them of any changes to fabric ports in situations involving fiber channel connectivity. RSCNs may thereby be delivered and implemented much faster than the timeouts. As a result, the SCSI drivers are informed about the node failure and the multipath driver also uses this information to switch communication paths and maintain operation of I/Os despite the node going offline.

For instance, a unit attention may be sent to a SCSI initiator (for each LUN) before implementing a planned outage activity. The unit attention will indicate that some communication path states will be changed in the SCSI target side. In response, the SCSI initiator may send a maintenance-in SCSI command 0xA3 to query the communication path details. As part of response to maintenance-in command, the target changes the communication path states to active non-optimized for all communication paths extending from the node going offline. In other words, all communication paths extending through the node going offline are preferably blocked such that I/O requests are not issued to the node while it is offline, e.g., as indicated by the dashed lines in FIG. 2B. In some instances, the target may change the communication path states to active optimized for the communication paths extending from the alternate node remaining online.

This process may be followed in a similar way for other nodes that go offline. For example, the nodes in a clustered layer may sequentially undergo a set of software updates to provide additional functionality. Thus, a similar process will be followed for each of the nodes being updated.

The state of the paths on a node that is going offline for maintenance are proactively set to active non-optimized, indicating to the SCSI driver to direct I/O requests to the alternate communication paths extending through another node. These communication paths are thereby changed to active optimized. Because this change occurs proactively, new I/O requests are switched over to the alternate node even before the node in question goes offline. The storage software on the node going offline also ensures that I/O requests previously issued to the node are satisfied before the node is taken offline. This ensures that the SCSI driver does not encounter SCSI timeouts on multiple paths to a node before it switches over during the failover process. This allows for communication paths to be switched virtually instantly, allowing for improved performance in real-time.

Figure 2C:
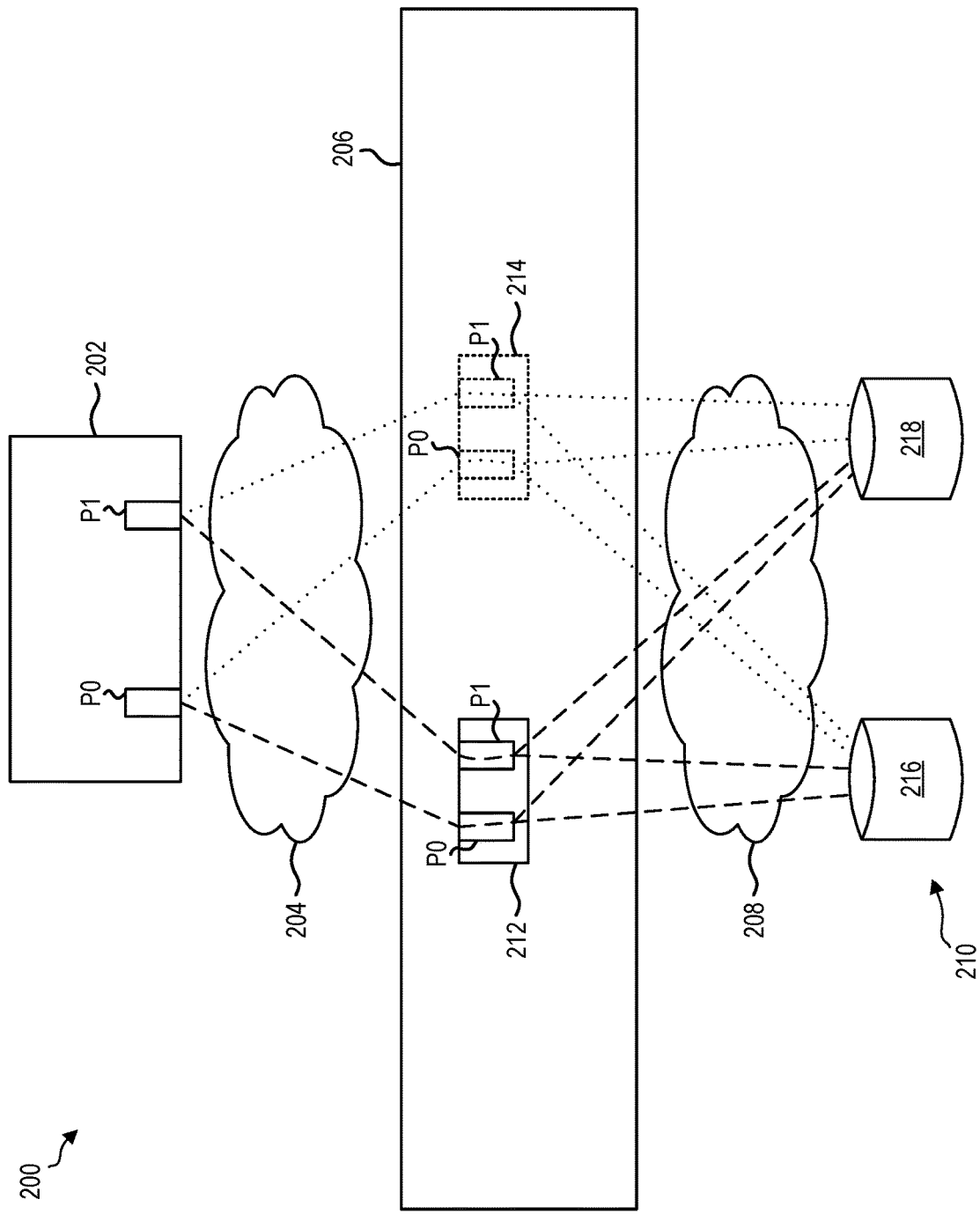
FIG. 2C is a representational view of the distributed system of FIG. 2A, in a second configuration according to one approach.

Referring now to FIG. 2C, the distributed system 200 is shown in a configuration where node 214 has been taken offline, as indicated by the dashed lines. As noted above, outages may be planned for nodes of a clustered layer, e.g., to update hardware and/or software implemented in the nodes. It follows that node 214 may be intentionally taken offline in order to replace hardware therein, update software implemented on the hardware therein, add functionality to the node, etc. Before being taken offline, a notification may be sent to node 214 and/or LUN 218 to provide notice of the planned downtime.

As a result, I/O requests for LUNs 216 and 218 are delivered through ports P0 and P1 of node 212 while node 214 is offline. Again, implementations herein are able to proactively notify host(s) regarding a planned node outage so that the multipath driver on the hosts can quickly switch over to alternate communication paths, e.g., as described above with respect to FIG. 2B.

Figure 2D:
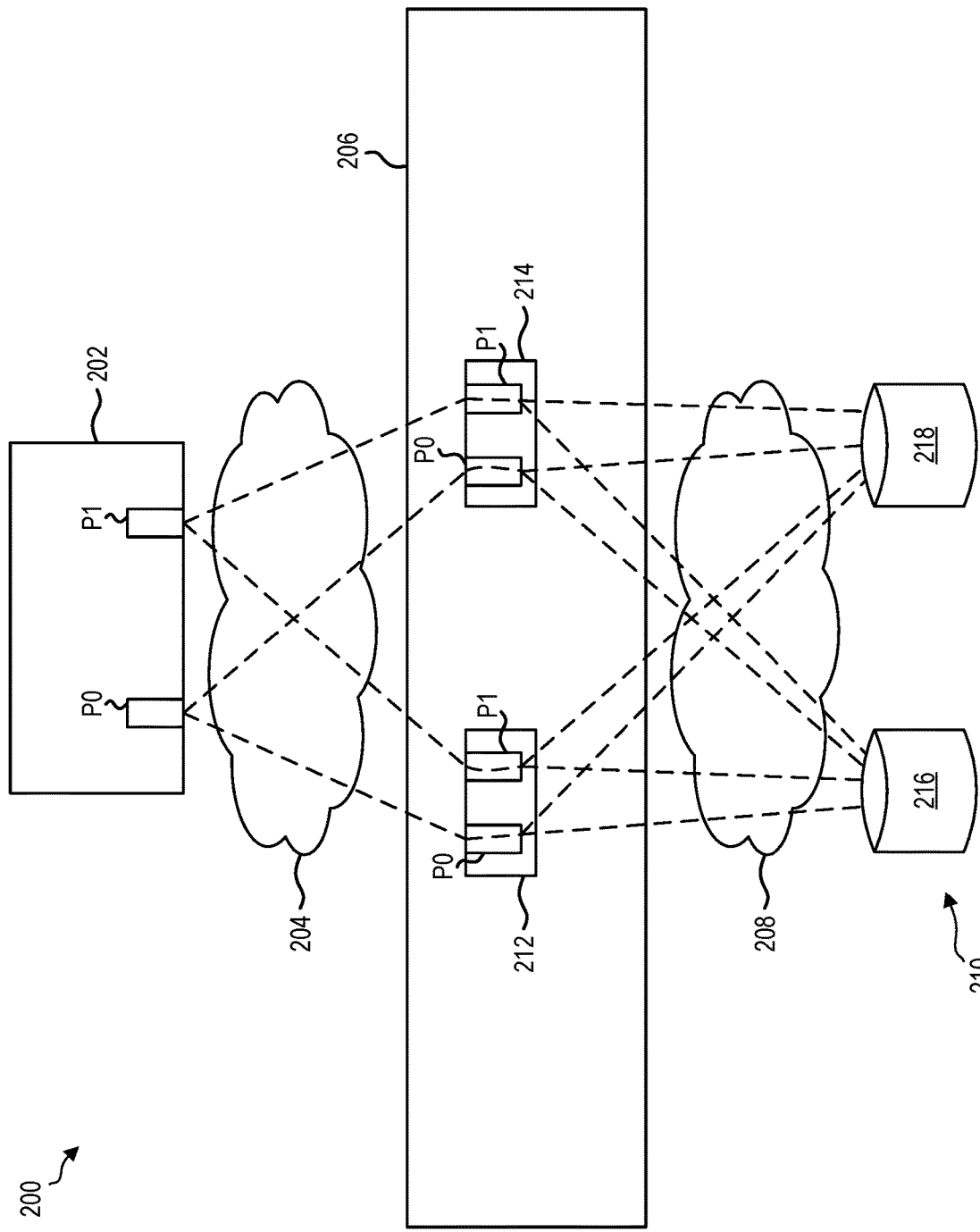
FIG. 2D is a representational view of the distributed system of FIG. 2A, in a second configuration according to one approach.

Furthermore, FIG. 2D shows both nodes 212, 214 back online following the updates that were performed. It follows that communication paths extend through ports P0 and P1 of both nodes 212, 214. It is preferred that the communication paths are equally divided between the nodes 212, 214 such that I/O requests are delivered to LUNs 216, 218 most efficiently. Accordingly, preferred communication paths are extending through node 212 for LUN 216 and through node 214 for LUN 218. It follows that the preferred communication channels and backup channels may be reestablished as desired during the process of reactivating both nodes 212, 214, e.g., as will be described in further detail below.

Figure 3:
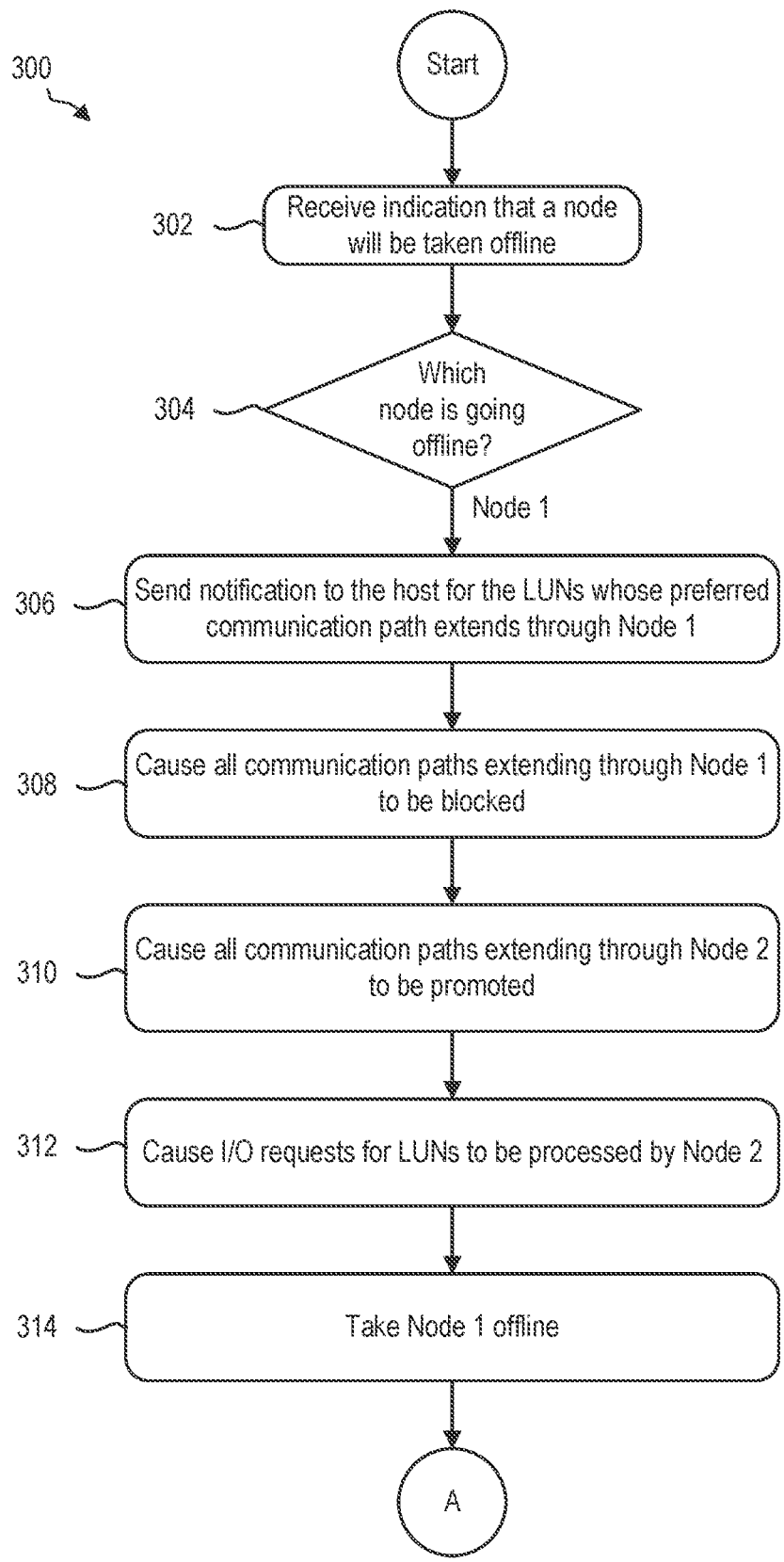
FIG. 3 is a flowchart of a method, in accordance with one approach.
Figure 3:
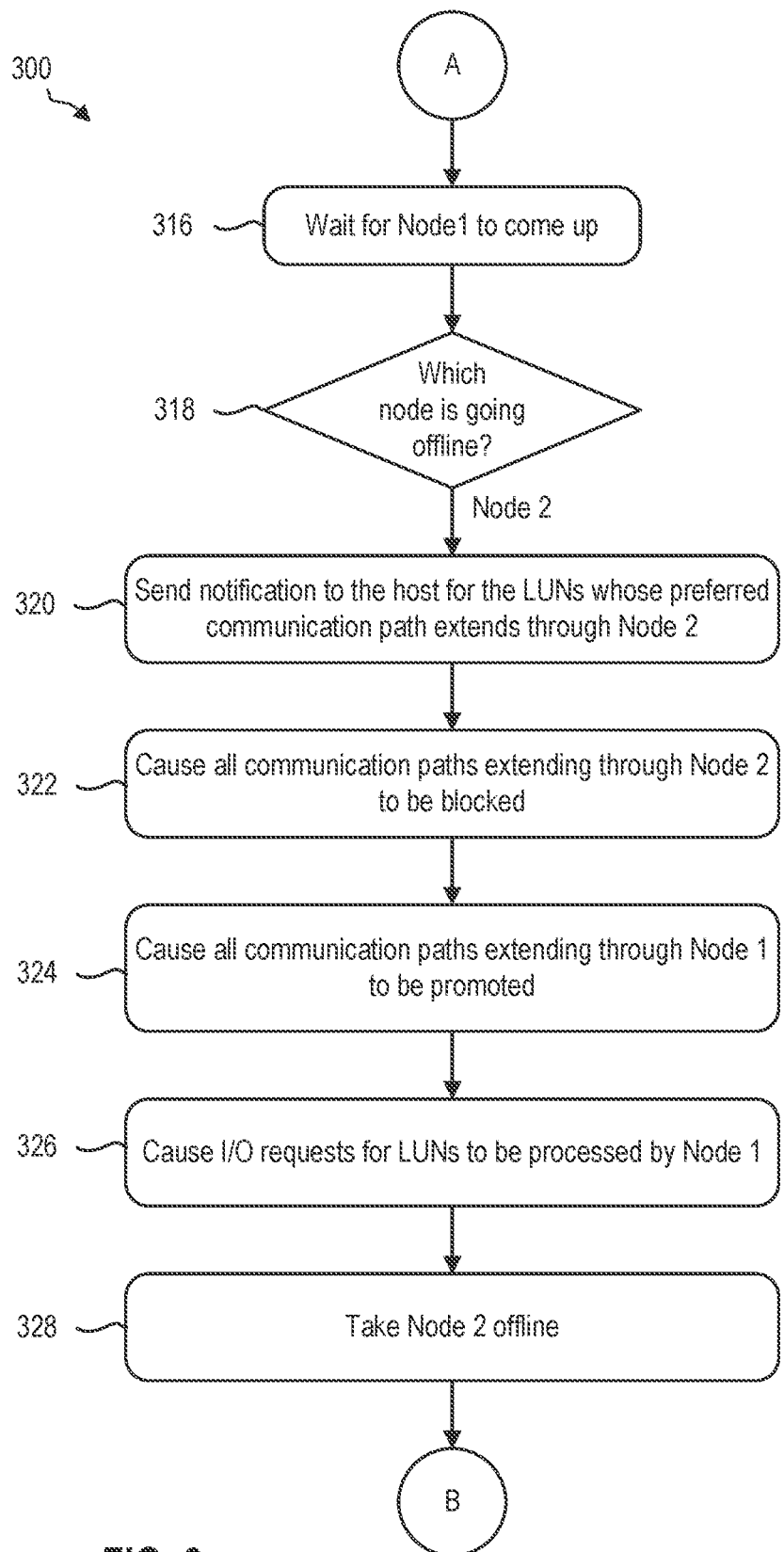
Figure 3:
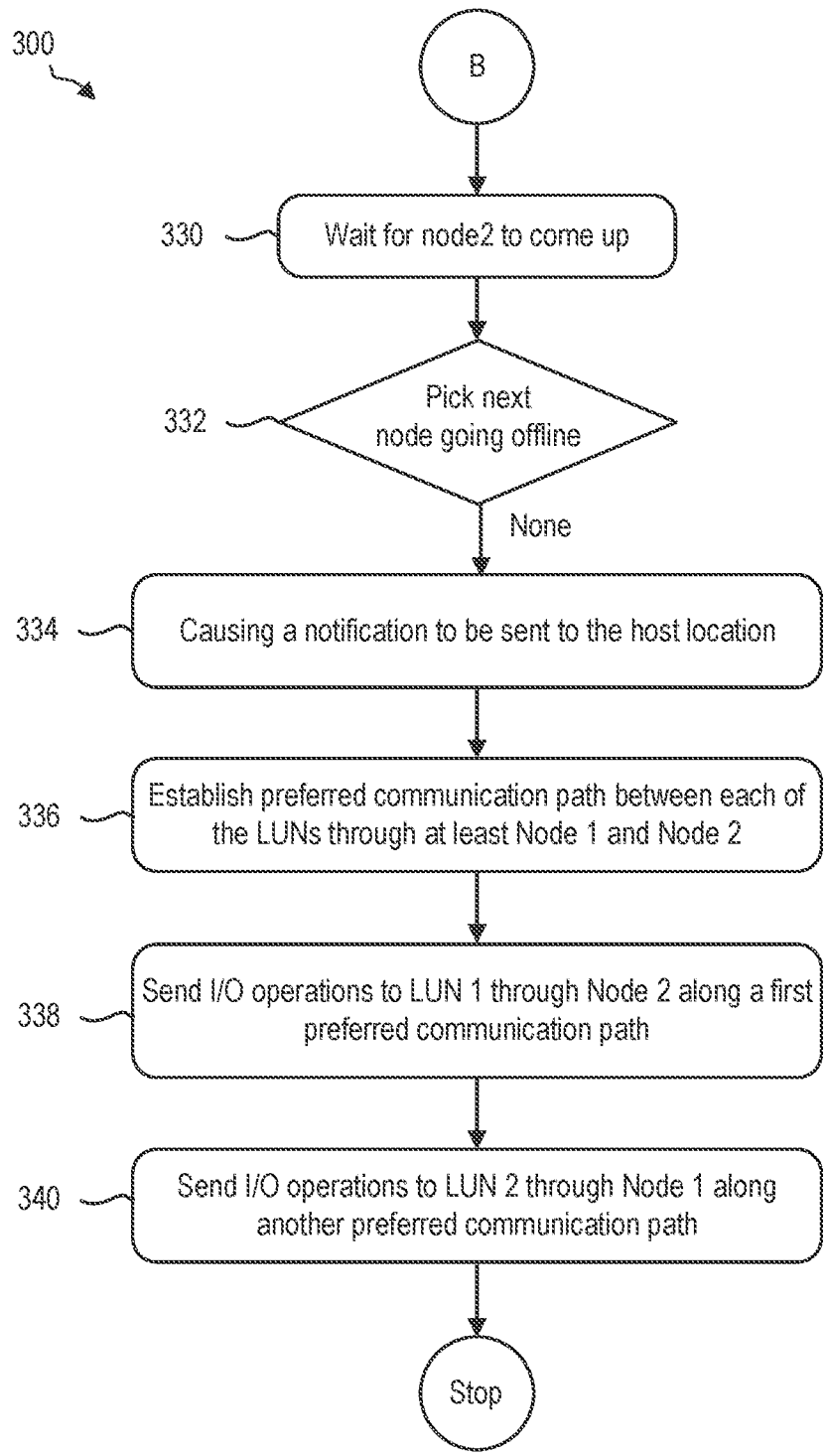

Looking now to FIG. 3, a flowchart of a method 300 for enabling planned outages of nodes in a clustered system without experiencing any data errors and/or decreased performance capabilities is shown according to one embodiment. These improvements are achieved by orchestrating the completion of I/O requests along alternate communication paths, e.g., as is described in further detail below. The method 300 may be performed in accordance with the present invention in any of the environments depicted in FIGS. 1-2D, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, any one or more of the operations in method 300 may be performed by a controller at a host location (e.g., see host location 202 of FIGS. 2A-2D). In other embodiments, the method 300 may be partially or entirely performed by a controller, a processor, a computer, etc., or some other device having one or more processors therein. Thus, in some embodiments, method 300 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, operation 302 of method 300 includes receiving an indication that a node will be temporarily taken offline. In some approaches, the indication may note that a specific one or more of the nodes may be taken offline. In other approaches, the indication may state that all nodes will be taken offline sequentially. As noted above, planned outages can occur for storage platforms during hardware and/or software upgrades. In a clustered storage environment like spectrum virtualize, these planned outage situations are preferably made known to all nodes. Accordingly, a notification may be sent to each node, informing the node of the received indication.

Proceeding to operation 304, the received indication is examined to determine which one or more of the nodes will be taken offline. In some instances, the indication may specify a first node to take offline, a preferred order for at least some of the nodes to be taken offline, etc. Thus, in response to determining that a first node "Node 1" is to be taken offline first, method 300 proceeds to operation 306. There, operation 306 includes sending a notification to the host for the LUNs in storage that have a preferred communication path that extends through Node 1. In other words, operation 306 includes notifying the host of each of the LUNs having active optimized communication paths that extend through Node 1. However, it should be noted that notifications are not sent for the LUNs that do not have preferred communication paths (e.g., active non-optimized paths) extending through Node 1. Upon receiving this unit attention, a SCSI initiator will be aware of a change in the path state for the respective LUN, and will query the path state via maintenance-in command (0xA3).

Operation 308 includes causing all communication paths extending through the first node to be blocked. In other words, operation 308 includes causing all communication paths that extend through Node 1 to be changed to active non-optimized, e.g., as shown in FIG. 2B above. Referring still to method 300 of FIG. 3, operation 310 further includes causing all communication paths extending through a second node "Node 2" to be promoted. In other words, operation 310 includes causing all communication paths that extend through Node 2 to be changed to active optimized, e.g., as shown in FIG. 2B above.

It follows that a target node may change path state information in response to receiving a Maintenance-in (0xA3) command from a SCSI initiator. Specifically, the target node may respond with path state as active non-optimized for all paths on the node that is going offline first. In an example all paths to Node 1 will be active non-optimized for LUN1. Path state information may also be updated for node(s) assuming the I/O requests intended for Node 1 while it is offline. In other words, communication paths extending through Node 2 are promoted to active optimized and will be used to perform I/O requests while Node 1 is offline, e.g., to perform an upgrade.

Accordingly, operation 312 of method 300 includes causing I/O requests for LUNs to be processed by Node 2. In addition to establishing Node 2 as performing the incoming I/O requests, it is also preferred that any existing I/O operations that had previously been assigned to Node 1 are completed before Node 1 is taken offline. This desirably ensures that data integrity is maintained and avoids failed I/O operations by avoiding prematurely taking Node 1 offline.

Thus, in response to establishing Node 2 to perform incoming I/O requests, and in response to determining that existing I/O requests previously assigned to the first node have been completed, the first node is taken offline. Operation 314 thereby includes taking Node 1 offline. While Node 1 is offline, it follows that I/O requests that would have otherwise been satisfied using communication paths extending through Node 1, are satisfied using communication paths extending through Node 2.

At operation 316, Node 1 comes back online. Node 1 may automatically come back online in response to successfully updating the hardware and/or software therein. Operation 318 further determines whether additional nodes should be taken offline as well. Operation 318 thereby determines whether any other nodes should be updated as well. In response to determining that Node 2 should be taken offline and updated, method 300 proceeds from operation 318 to operation 320.

There, operation 320 includes sending a notification to the hosts ("SCSI initiator") for all LUNs in storage that have a preferred communication path that extends through Node 2. In other words, operation 320 includes notifying the host regarding each of the LUNs having active optimized communication paths that extend through Node 2. However, it should be noted that notifications are not sent for the LUNs that do not have preferred communication paths (e.g., active non-optimized paths) extending through Node 2. As noted above, a SCSI initiator will be aware of a change in the path state for the respective LUN in response to receiving this unit attention, and will query the path state via maintenance-in command (0xA3), e.g., as would be appreciated by one skilled in the art after reading the present description.

Operation 322 further includes causing all communication paths extending through Node 2 to be blocked. In other words, operation 322 includes causing all communication paths that extend through Node 2 to be changed from active optimized, to active non-optimized, e.g., as shown in FIG. 2C above. Referring still to method 300 of FIG. 3, operation 324 further includes causing all communication paths extending through Node 1 to be promoted. In other words, operation 324 includes causing all communication paths that extend through Node 1, which was recently brought back online, to be changed to active optimized, e.g., as shown in FIG. 2C above.

Again, a target node may change path state information in response to receiving a Maintenance-in (0xA3) command from a SCSI initiator. Specifically, the target node may respond with path state as active non-optimized for all paths on the node that is going offline next (e.g., currently). In an example all paths to Node 2 will be active non-optimized. Path state information may also be updated for node(s) assuming the I/O requests intended for Node 2 while it is offline. In other words, communication paths extending through Node 1 are promoted to active optimized and will be used to perform I/O requests while Node 2 is offline, e.g., to perform an upgrade.

Accordingly, operation 326 of method 300 includes causing I/O requests for LUNs to be processed by Node 1 while Node 2 is offline. In addition to establishing Node 1 as performing the incoming I/O requests, it is also preferred that any existing I/O operations that had previously been assigned to Node 2 are completed before Node 2 is taken offline. This desirably ensures that data integrity is maintained and avoids failed I/O operations by avoiding prematurely taking Node 2 offline, e.g., as described above.

Thus, in response to establishing Node 1 to perform incoming I/O requests, and in response to determining that existing I/O requests previously assigned to Node 2 have been completed, Node 2 is taken offline. Operation 328 thereby includes taking Node 2 offline. While Node 2 is offline, it follows that I/O requests that would have otherwise been satisfied using communication paths extending through Node 2, are satisfied using communication paths extending through Node 1.

At operation 330, Node 2 comes back online. Node 2 may automatically come back online in response to successfully updating the hardware and/or software therein. Operation 332 further determines whether additional nodes should be taken offline as well. In response to determining that no more nodes are to be taken offline, method 300 proceeds to operation 334. There, operation 334 includes causing a notification to be sent to the host ("SCSI initiator") connected to Node 1 and Node 2. For example, the notification may be a SCSI unit attention. As a result, all communication paths extending through Node 1 and Node 2 may be unblocked and made available for preferred or backup communication paths, e.g., as will soon become apparent.

Operation 336 further includes establishing preferred communication path between each of the LUNs through at least Node 1 and Node 2. For instance, a first preferred communication path is established between LUN 1 through Node 2, and a second preferred communication path is established between LUN 2 through Node 1 (e.g., see FIG. 2D above). It should also be noted that implementations having a greater number of LUNs and/or nodes may include establishing more than two different preferred communication paths and/or backup communication paths, e.g., as would be appreciated by one skilled in the art after reading the present description. However, it is preferred that the communication paths are evenly spread across the available nodes. As mentioned above, this maintains a high throughput for the system and reduces I/O latency.

Referring still to FIG. 3, operation 338 includes sending I/O operations to LUN 1 along a first preferred communication path, while operation 340 includes sending I/O operations to LUN 2 along another preferred communication path. According to the example above, I/O operations may be sent to LUN 1 through Node 2 along a preferred communication path, while I/O operations are sent to LUN 2 through node 1 along another preferred communication path (e.g., again, see FIG. 2D above). However, this is in no way intended to be limiting. Rather, a preferred communication path may be established between any LUN or other portion of memory and a desired node. Again, it is also preferred that the communication paths are divided among the nodes as evenly as possible to increase throughput of the resulting communication paths following the updates performed to the nodes.

It follows that method 300 is able to seamlessly implement updates to software and/or hardware of a network, without impacting performance in real-time. Implementations herein are thereby able to overcome processing based issues that have plagued conventional systems.

These improvements are applicable for iSCSI, FC, iSER, and any other protocol that works with the higher level SCSI protocol. Implementations herein thereby ensure that I/O processing is not disrupted by this failover failback process. Rather than relying on SCSI I/O timeouts to detect a connection issue on the host system, hosts will be notified much earlier and thereby can retry I/O requests on surviving paths much faster than has been conventionally achievable.

Figure 4:
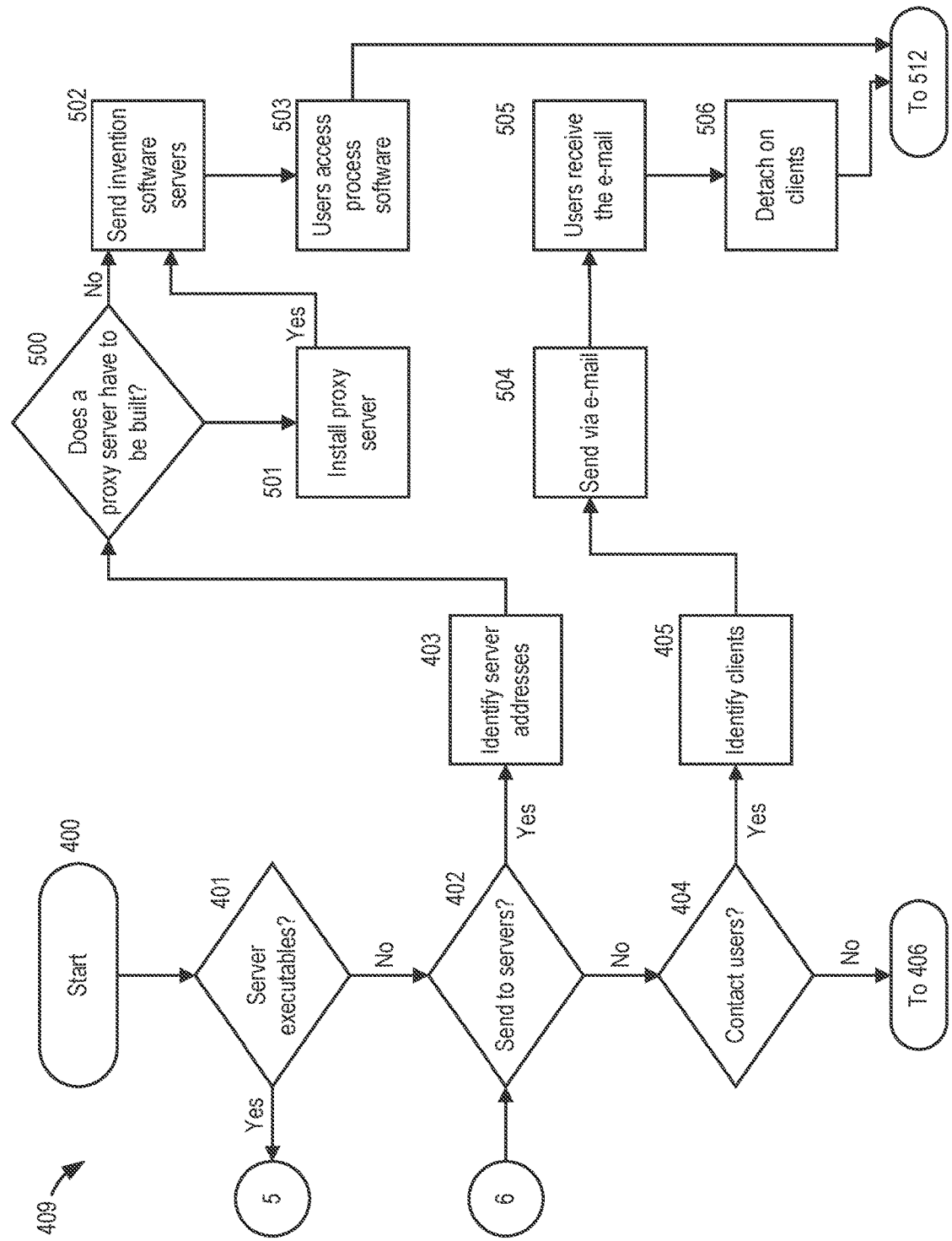
FIG. 4 is a flowchart of a method, in accordance with one approach.
Figure 4:
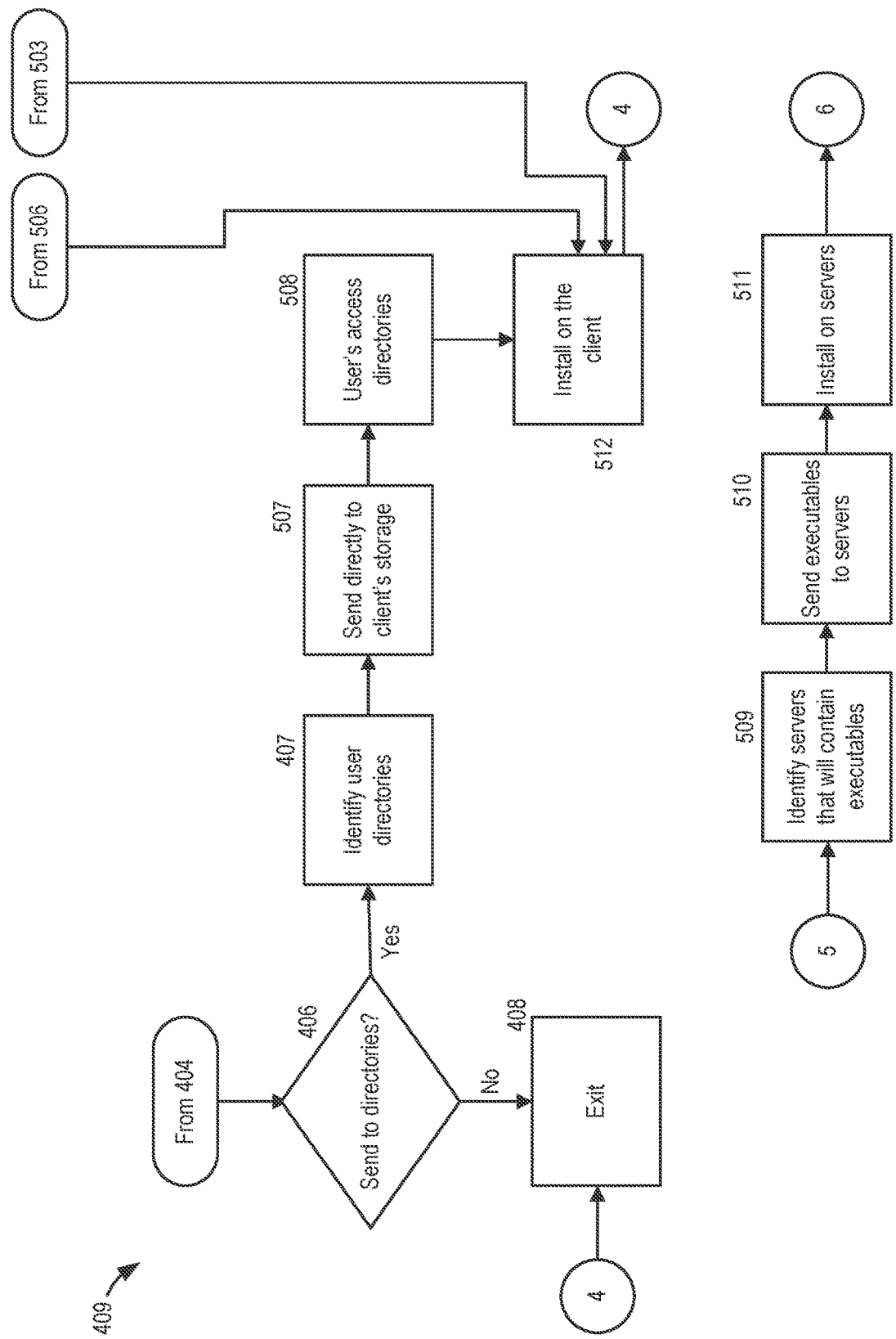

Now referring to FIG. 4, a flowchart of a method 409 is shown according to one approach. The method 409 may be performed in accordance with the present invention in any of the environments depicted in FIGS. 1-3B, among others, in various approaches. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various approaches, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with enabling planned outages of nodes in a clustered system without experiencing any data errors and/or decreased performance capabilities, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed (401). If this is the case, then the servers that will contain the executables are identified (509). The process software for the server or servers is transferred directly to the servers' storage via FTP or some other protocol or by copying though the use of a shared file system (510). The process software is then installed on the servers (511).

Next, a determination is made on whether the process software is to be deployed by having users access the process software on a server or servers (402). If the users are to access the process software on servers, then the server addresses that will store the process software are identified (403).

A determination is made if a proxy server is to be built (500) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (501). The process software is sent to the (one or more) servers either via a protocol such as FTP, or it is copied directly from the source files to the server files via file sharing (502). Another approach involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (503). Another approach is to have the servers automatically copy the process software to each client and then run the installation program for the process software at each client computer. The user executes the program that installs the process software on the client computer (512) and then exits the process (408).

In step 404 a determination is made whether the process software is to be deployed by sending the process software to users via e-mail. The set of users where the process software will be deployed are identified together with the addresses of the user client computers (405). The process software is sent via e-mail (504) to each of the users' client computers. The users then receive the e-mail (505) and then detach the process software from the e-mail to a directory on their client computers (506). The user executes the program that installs the process software on the client computer (512) and then exits the process (408).

Lastly, a determination is made on whether the process software will be sent directly to user directories on their client computers (406). If so, the user directories are identified (407). The process software is transferred directly to the user's client computer directory (507). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (508). The user executes the program that installs the process software on the client computer (512) and then exits the process (408).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving an indication that a first node will be taken offline, wherein a first logical unit number (LUN) having a preferred communication path extends through the first node;
    causing communication paths extending through the first node to be blocked;
    causing communication paths extending through a second node to be promoted;
    in response to determining that existing input/output (I/O) operations previously assigned to the first node have been completed, causing the first node to go offline;
    sending I/O operations to the first LUN through the second node while the first node is offline;
    in response to the first node coming back online, causing a notification to be sent to a host regarding a second LUN having a preferred communication path that extends through the second node;
    causing communication paths extending through the second node to be blocked;
    causing communication paths extending through the first node to be promoted; and
    in response to determining that existing I/O operations previously assigned to the second node have been completed, causing the second node to go offline.

2. The computer-implemented method of claim 1, comprising:
    in response to the first node coming back online, causing a notification to be sent to the host regarding (i) the first LUN, and (ii) a second LUN having a preferred communication path that extends through the second node;

causing communication paths extending through the first node to be unblocked;

establishing a first preferred communication path between the first LUN and the first node;

establishing a second preferred communication path between the second LUN and the second node;

sending I/O operations to the first LUN through the first node along the first preferred communication path; and sending I/O operations to the second LUN through the second node along the second preferred communication path.

3. The computer-implemented method of claim 2, comprising:

sending I/O operations to the first and second LUNs through the second node while the first node is offline.

4. The computer-implemented method of claim 1, comprising:

in response to the first node coming back online, causing a notification to be sent to the host regarding the second LUN having a preferred communication path that extends through the second node; and sending I/O operations to the first and second LUNs through the first node while the second node is offline.

5. The computer-implemented method of claim 4, comprising:

in response to the second node coming back online, causing a notification to be sent to the host regarding the first and second LUNs;

causing communication paths extending through the second node to be unblocked;

establishing a first preferred communication path between the first LUN and the first node;

establishing a second preferred communication path between the second LUN and the second node;

sending I/O operations to the first LUN through the first node along the first preferred communication path; and sending I/O operations to the second LUN through the second node along the second preferred communication path.

6. The computer-implemented method of claim 4, comprising:

while the second node is offline, causing a software and/or hardware upgrade to be performed on the second node.

7. The computer-implemented method of claim 1, wherein causing communication paths extending through the first node to be blocked includes indicating all communication paths extending through the first node as active non-optimized, wherein causing communication paths extending through the second node to be promoted includes indicating all communication paths extending through the second node as active optimized.

8. The computer-implemented method of claim 1, comprising:

while the first node is offline, causing a software and/or hardware upgrade to be performed on the first node.

9. A computer program product, comprising a computer readable storage medium having program instructions embodied therewith, the program instructions readable by a processor, executable by the processor, or readable and executable by the processor, to cause the processor to:

receiving an indication that a first node will be taken offline, wherein a first logical unit number (LUN) having a preferred communication path that extends through the first node;

cause communication paths extending through the first node to be blocked;

cause communication paths extending through a second node to be promoted;

in response to determining that existing input/output (I/O) operations previously assigned to the first node have been completed, cause the first node to go offline;

send I/O operations to the first LUN through the second node while the first node is offline;

in response to the first node coming back online, causing a notification to be sent to a host regarding a second LUN having a preferred communication path that extends through the second node;

causing communication paths extending through the second node to be blocked;

causing communication paths extending through the first node to be promoted; and in response to determining that existing I/O operations previously assigned to the second node have been completed, causing the second node to go offline.

10. The computer program product of claim 9, wherein the program instructions are readable and/or executable by the processor to cause the processor to:

in response to the first node coming back online, cause a notification to be sent to the host regarding (i) the first LUN, and (ii) a second LUN having a preferred communication path that extends through the second node;

cause communication paths extending through the first node to be unblocked;

establish a first preferred communication path between the first LUN and the first node;

establish a second preferred communication path between the second LUN and the second node;

send I/O operations to the first LUN through the first node along the first preferred communication path; and send I/O operations to the second LUN through the second node along the second preferred communication path.

11. The computer program product of claim 10, wherein the program instructions are readable and/or executable by the processor to cause the processor to:

send I/O operations to the first and second LUNs through the second node while the first node is offline.

12. The computer program product of claim 9, wherein the program instructions are readable and/or executable by the processor to cause the processor to:

in response to the first node coming back online, cause a notification to be sent to the host regarding the second LUN having a preferred communication path that extends through the second node; and send I/O operations to the first and second LUNs through the first node while the second node is offline.

13. The computer program product of claim 12, wherein the program instructions are readable and/or executable by the processor to cause the processor to:

in response to the second node coming back online, cause a notification to be sent to the host regarding the first and second LUNs;

cause communication paths extending through the second node to be unblocked;

establish a first preferred communication path between the first LUN and the first node;

establish a second preferred communication path between the second LUN and the second node;

send I/O operations to the first LUN through the first node along the first preferred communication path; and send I/O operations to the second LUN through the second node along the second preferred communication path.

14. The computer program product of claim 12, wherein the program instructions are readable and/or executable by the processor to cause the processor to:
while the second node is offline, cause a software and/or hardware upgrade to be performed on the second node.

15. The computer program product of claim 9, wherein causing communication paths extending through the first node to be blocked includes indicating all communication paths extending through the first node as active non-optimized, wherein causing communication paths extending through the second node to be promoted includes indicating all communication paths extending through the second node as active optimized.

16. The computer program product of claim 9, wherein the program instructions are readable and/or executable by the processor to cause the processor to:
while the first node is offline, cause a software and/or hardware upgrade to be performed on the first node.

17. A system, comprising:
a host;
a clustered layer having first and second nodes;
a hardware processor; and
logic integrated with the hardware processor, executable by the hardware processor, or integrated with and executable by the hardware processor, the logic being configured to:
receive an indication that a first node will be taken offline, wherein a first logical unit number (LUN) having a preferred communication path extends through the first node;
cause communication paths extending through the first node to be blocked;
cause communication paths extending through a second node to be promoted;
in response to determining that existing input/output (I/O) operations previously assigned to the first node have been completed, cause the first node to go offline;
send I/O operations to the first LUN through the second node while the first node is offline;
in response to the first node coming back online, cause a notification to be sent to the host regarding a second LUN having a preferred communication path that extends through the second node;
cause communication paths extending through the second node to be blocked;
cause communication paths extending through the first node to be promoted; and
in response to determining that existing I/O operations previously assigned to the second node have been completed, cause the second node to go offline.

18. The system of claim 17, wherein the logic is configured to:
in response to the first node coming back online, cause a notification to be sent to the host regarding (i) the first LUN, and (ii) a second LUN having a preferred communication path that extends through the second node;
cause communication paths extending through the first node to be unblocked;
establish a first preferred communication path between the first LUN and the first node;
establish a second preferred communication path between the second LUN and the second node;
send I/O operations to the first LUN through the first node along the first preferred communication path; and
send I/O operations to the second LUN through the second node along the second preferred communication path.

19. The system of claim 18, wherein the logic is configured to:
send I/O operations to the first and second LUNs through the second node while the first node is offline.

20. The system of claim 17, wherein the logic is configured to:
in response to the first node coming back online, cause a notification to be sent to the host regarding the second LUN having a preferred communication path that extends through the second node;
and
send I/O operations to the first and second LUNs through the first node while the second node is offline.

* * * * *